United States Patent Office 3,232,179
Patented Feb. 1, 1966

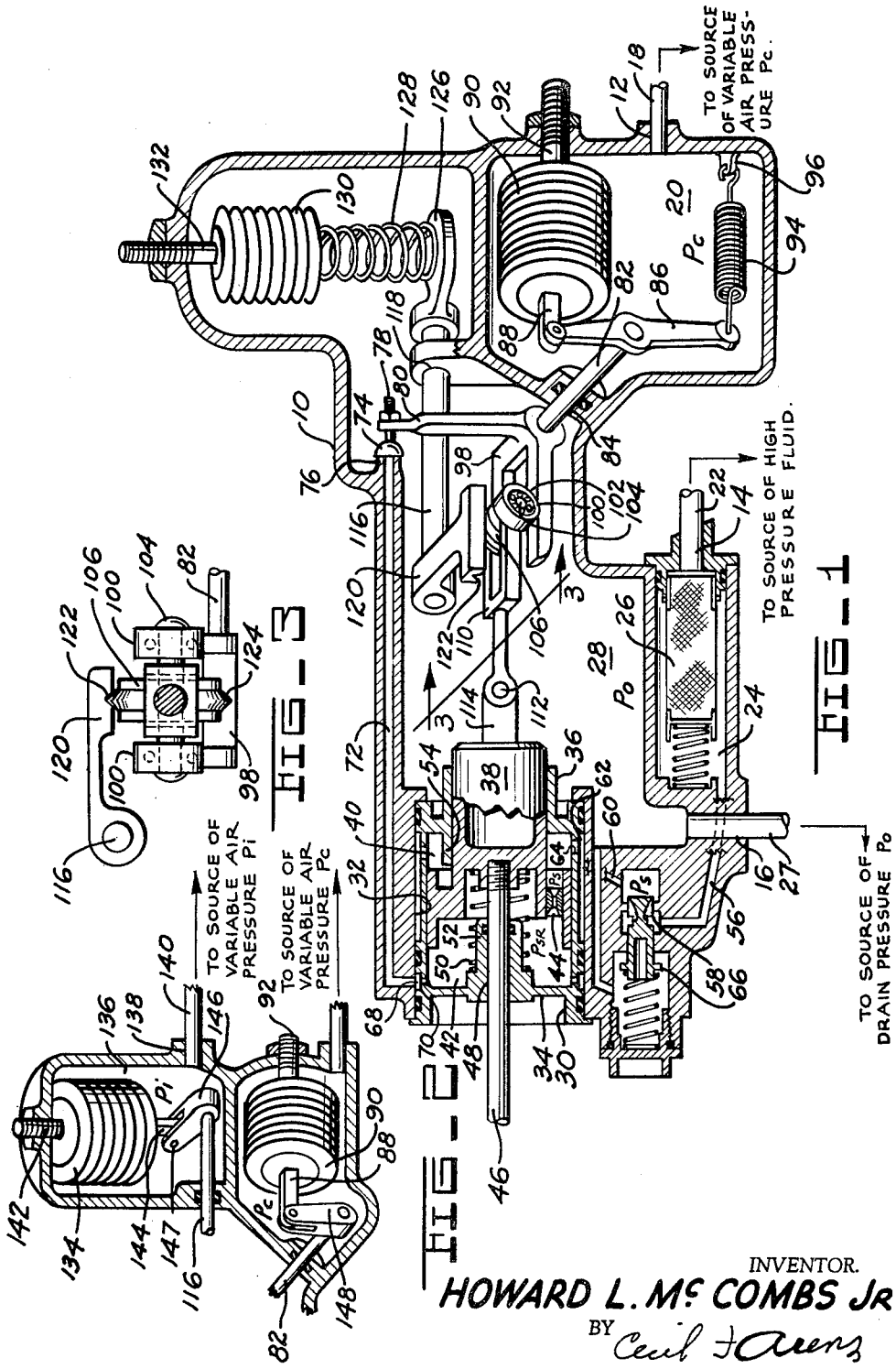

3,232,179
SERVO CONTROL APPARATUS
Howard L. McCombs, Jr., South Bend, Ind., assignor to The Bendix Corporation, a corporation of Delaware
Filed July 21, 1958, Ser. No. 749,679
21 Claims. (Cl. 91—385)

This invention relates to servo mechanism and more particularly to apparatus for converting an input signal into a mechanical position such that the mechanical position is proportional to the input signal.

In many servo systems, it is desirable to maintain a linear relationship between the input signal and the displacement of a movable member actuated in response to the input signal. Heretofore, such a relationship has been exceedingly difficult to maintain in conventional servo systems wherein springs are utilized as part of the control network. The stretching or compressing of these springs has an undesirable effect on the spring rate of the springs and, in circumstances where the temperature of the springs varies with variations in an ambient temperature, additional complications which effect the spring rates are introduced into the system. Numerous attempts have been made to eliminate such undesirable effects on spring rates most of which feature complex compensating mechanisms that are not entirely accurate or reliable over the working range of the springs and, in addition, add to the size, weight and cost of the finished product. It is, therefore, an object of this invention to provide means for maintaining a linear relationship between an input force and an output mechanical position.

It is another object of this invention to provide simple and reliable force transmitting means which is capable of maintaining a linear relationship between an input force and an output force over a wide range of operation.

It is a further object of this invention to provide a servo mechanism in which a variable input force is balanced by a constant reference force through variable ratio lever means over a wide range of values of the input force.

It is an important object of this invention to provide a servo system with a highly accurate and reliable force transmitting medium which maintains a predetermined linear relationship between an input force and an output mechanical position.

It is still another object of this invention to provide a relatively small, lightweight, and inexpensive servo system.

Other objects and advantages will become apparent to those skilled in the art in view of the following description taken in conjunction with the drawings, wherein:

FIGURE 1 is a schematic representation of a hydromechanical servo system embodying the present invention;

FIGURE 2 is a schematic representation of a modification of a portion of FIGURE 1; and FIGURE 3 is a transverse section taken on line 3—3 of FIGURE 1.

Referring to FIGURE 1, numeral 10 represents a casing having inlet ports 12 and 14 and an outlet port 16. The inlet port 12 is connected to a source of variable air pressure $P_c$, not shown, via a conduit 18 and opens into a chamber 20. The inlet port 14 is connected to a source of fluid, not shown, at a relatively high pressure $P_1$ via a conduit 22 and opens into a chamber 24 having a fluid filter 26 disposed therein. The outlet port 16 is connected to a source of drain fluid, not shown, at a relatively low fluid pressure $P_0$ via a conduit 27 and opens into a chamber 28. A sleeve member 30 fixedly secured in position in a bore 32 is closed at one end by a wall 34 and, at the opposite end, is provided with a reduced diameter section 36. A stepped diameter piston 38 is slidably carried in sleeve member 30 and together with sleeve member 30 forms two variable volume chambers 40 and 42 which communicate via a restriction 44 removable secured in the web of piston 38. A rod 46 fixedly secured to the center of the piston 38 extends therefrom through an opening 48 in the wall 34. A spring 50 interposed between wall 34 and piston 38 preloads the piston 38. Stop members 52 and 54 formed on wall 34 and reduced diameter section 36, respectively, serve to limit the travel range of piston 38. Filtered high pressure fluid flows from chamber 24 to variable volume chamber 40 via a passage 56, a valve orifice 58, a passage 60, an annulus 62 and ports 64 formed in sleeve member 30.

A spring loaded pressure regulating valve 66 of conventional design and operation cooperates with the orifice 58 to reduce the high fluid pressure $P_1$ to servo pressure $P_s$. The pressure $P_s$ is maintained at a constant predetermined value in accordance with the spring load applied to the regulating valve 66 by a spring. The piston 38 is positioned in accordance with a $P_s$—$P_{sr}$ pressure drop which exists across restriction 44 through which fluid flows from chamber 40 to chamber 42. The chamber 42 is vented to chamber 28 via ports 68 and annulus 70 in sleeve member 30 and a passage 72. A flapper valve 74 coacts with a valve seat 76 formed at the outlet end of passage 72 to vary the fluid flow therefrom and thus the pressure $P_{sr}$ in chamber 42.

The flapper valve 74 contacts a pin 78 threadedly engaged in the end of a lever 80 and is positioned relative to valve seat 76 in accordance with movement of lever 80 which is fixedly secured to one end of a rod 82. The rod 82 is journaled in an opening 84 in casing 10 and extends therethrough into chamber 20 where it is fixedly secured to a bell crank 86 which in turn is pivotally connected at one end to a link 88 fixedly secured to the movable end of an evacuated bellows 90. The opposite end of the bellows 90 is fixedly secured to and held in position by an adjustable retaining member 92 threadedly engaged with casing 10. A trim spring 94 connected to the opposite end of the bell crank 86 and to a spring retaining lug 96 formed on casing 10 serves to load the bellows 90 in opposition to the air pressure $P_c$ acting thereagainst. A bifurcated lever 98 integral with lever 80 extends therefrom at a right angle. Each of the bifurcations has a flat surface upon which an associated roller member 100 rides, which roller members are rotatably mounted on suitable anti-friction bearings 102 carried by an axle 104. A roller member 106 is mounted on a suitable anti-friction bearing, not shown, similar to bearings 102 and carried by axle 104 intermediate roller members 100. The axle 104 is carried by a yoke 110 which maintains the roller members 100 and 106 in spaced apart relationship. The yoke 110 is pivotally connected by means of a pin 112 to a link 114 fixedly secured to piston 38 and moves in follow-up to movement of piston 38. A rod 116 journaled in an opening 118 in casing 10 rotates on an axis which is at right angles to the axis of rod 82. A lever 120 fixedly secured to one end of the rod 116 is provided with a cross piece at its free end which has a V-shaped depression or track 122 formed therein. The roller member 106 has a V-shaped peripheral edge 124 which rides in the track 122. The lever 126 is loaded by a compression spring 128 interposed between the lever 126 and a stack of bimetallic discs 130 which expand or contract with variations of the temperature of the fluid in chamber 28. The opposite end of the stack of discs 130 is anchored in position by an adjustable support member 132 threadedly engaged with casing 10.

FIGURE 2 illustrates a modification of FIGURE 1 wherein the spring 128 and bimetallic discs 130 are replaced by an evacuated bellows 134. With this arrangement, the bellows 134 is mounted in a chamber 136 having an inlet port 138 which communicates with a second source, not shown, of variable air pressure $P_i$ via a conduit 140. One end of the bellows 134 is secured to and anchored in position by an adjustable support 142 threadedly engaged with casing 10. A link 144 fixedly secured to the movable end of the bellows 134 is pivotally connected to a lever 146 via a pin 147. The lever 146 is fixedly secured to rod 116. The trim spring 94 and bell crank 86 shown in FIGURE 1 are deleted in FIGURE 2 and, in place thereof, the rod 82 is shown connected to bellows 90 via a link 148.

Operation of FIGURE 1

To facilitate describing the operation of the device, it will be assumed that the present invention is to be used for control purposes in the fuel system of an aircraft jet engine, not shown, in which case the variable air pressures $P_i$ and $P_c$ are air compressor inlet and discharge pressures, respectively, and drain pressure $P_o$ is main fuel pump inlet pressure. The rod 46 may be connected to a fuel control valve in the fuel system which is positioned as a function of compressor discharge pressure $P_c$ only in the case of FIGURE 1.

At the outset, it will be assumed that a constant pressure $P_c$ exists in chamber 20 in response to which the mechanism of the present invention is stabilized in a position as shown in FIGURE 1, in accordance with the equation $F_b \times d_1 = F_s \times d_2$ wherein $F_b$ represents the bellows 90 input force, $d_1$ represents the lever arm between bellows 90 and the axis of rod 82, $F_s$ represents the force of spring 128, and $d_2$ represents the lever arm between the rollers 100 and the axis of rod 82. Since $d_1$ and $F_s$ remain constant it is apparent that $d_2$ is proportional to $F_b$ over the operating range of the device. A subsequent rise in compressor discharge pressure $P_c$ results in compression of bellows 90 and a corresponding increase in the input force signal applied by the bellows 90 to the bell crank 86 which rotates causing the rod 82 together with levers 80 and 98 to rotate in a clockwise direction against the output force of spring 128 acting through link 126, rod 116, lever 120 and roller members 106 and 100 against lever 98. The flapper valve 74 follows the movement of lever 80 and moves away from valve seat 76 whereupon pressure $P_s$ is vented to chamber 28. The $P_s - P_{sr}$ pressure drop across piston 38 increases driving the piston 38 toward the stop member 52. The yoke 110 moves with piston 38 causing the roller members 100 to travel along lever 98 whereupon the effective lever arm between the roller member 100 and the axis of rod 82 increases. At the same time, roller member 106 travels along the track 122 in lever 120. The effective lever arm of lever 120 remains unchanged due to a parallel relationship between track 122 and the axis of rod 116 and a constant force is exerted against roller member 106. As the effective lever arm of lever 98 increases, a corresponding greater torque is applied to rod 82 in opposition to the torque resulting from the bellows 90 acting through bell crank 86. When the two opposing torques become equal the flapper valve 74 is at its original position whereupon the piston 38 is stabilized in position. The movement of piston 38 is transmitted through rod 46 to a fuel valve, not shown, which causes a readjustment in fuel flow to the engine in accordance with the increase in compressor discharge pressure $P_c$. A decrease in pressure $P_c$ results in a reversal of the above mentioned sequence of operation.

In systems of this type, the temperature of the fluid surrounding spring 128 may vary over a wide range of values due to ambient air temperature and/or the tempearture of the fluid at the drain source. To compensate for changes in the output force of spring 128 caused by temperature variations of the fluid in chamber 28, the stack of bimetallic discs 130 or any other suitable temperature responsive member is connected to spring 128 such that with an increase in temperature, in response to which the output force of spring 128 tends to decrease, the bimetallic discs 130 expand and compress spring 128 to restore the output force of the spring 128 to its original value. A decrease in temperature which causes an increase in the output force of the spring 128 is compensated for by the bimetallic discs 130 which contract to cause a corresponding lengthening of spring 128 such that the output force of spring 128 returns to the original value.

Operation of FIGURE 2

In FIGURE 2, chambers 136 and 20 are connected to compressor inlet air pressure $P_i$ and compressor discharge air pressure $P_c$, respectively, and the ratio of these two pressures is used as the control signal for actuating piston 38. The operation of the system is essentially the same as that of FIGURE 1 except that in equilibrium its operation is defined by the equation $F_b \times d_1 = F_i \times d_2$ wherein $F_b$ represents the bellows 90 input force, $d_1$ represents the lever arm between bellows 90 and the axis of rod 82, $F_i$ represents the bellows 134 input force, and $d_2$ represents the lever arm between roller 100 and the axis of rod 82. Since $d_1$ is a constant it follows that $d_2$ is proportional to the ratio of forces $F_b/F_i$.

Considering the system to be in equilibrium initially at some given value of $F_b/F_i$, any subsequent increase in pressure $P_c$ or decrease in pressure $P_i$ results in an increase in the ratio of forces $F_b/F_i$ in response to which the forces acting to rotate rod 82 are unbalanced in a direction to cause opening movement of flapper valve 74 and a corresponding actuation of piston 38 toward stop member 52 until the forces acting to rotate rod 82 are again balanced. To illustrate this operation, an increase in pressure $P_c$ causes compression of bellows 90 which results in an increase in the torque applied to rod 82 in a clockwise direction. The levers 80 and 98 are rotated clockwise by rod 82 and flapper valve 74 moves accordingly in an opening direction whereupon the pressure $P_s$ is vented to chamber 28. The piston 38 moves toward stop member 52 in response to the increase in $P_s - P_{sr}$ pressure drop thereacross. The yoke 110 and roller members 100 and 106 follow the piston 38 and the resulting increase in lever arm $d_2$ through which $F_i$ acts causes the torque applied to rod 82 in a counterclockwise direction to increase until the rod 82 is again stabilized.

A decrease in pressure $P_i$ results in a decrease in $F_i$ and a corresponding reduction in the torque tending to rotate rod 82 in a counterclockwise direction. The sequence of operation which follows this reduction in torque is the same as that heretofore mentioned in regard to an increase in pressure $P_c$ and, therefore, does not require additional explanation. Of course, the above mentioned sequence of operation is reversed in the case of a decrease in pressure $P_c$ or an increase in pressure $P_i$.

It will be apparent to one skilled in the art that various modifications and changes in the form and relative arrangements of parts may be made to suit requirements of a particular system without departing from the spirit of the invention. The input force signal or signals may be generated by air pressure acting against a bellows as shown in the drawings or by any other means such as a lever actuated spring, speed actuated centrifugal weights and the like.

I claim:

1. In a servo system, the combination of means responsive to a variable input force, means responsive to a variable output force, means for controlling said variable output force as a function of said variable input force including a lever operatively connected to and loaded by said first named means to provide an input torque, said lever being rotated about an axis, resilient means providing a constant reference force, force transmitting means operatively connected to said lever and said resilient means through which said constant reference force acts in opposition to said variable input force, and follow-up means actuated by said output force responsive means operatively connected to said force transmitting means for actuating the same, said force transmitting means being moved by said follow-up means relative to said axis to cause an increase or a decrease in the effective lever arm of said lever in accordance with an increase or a decrease, respectively, of said variable input force whereupon said input torque is balanced by an equal and opposite torque developed by said constant reference force acting through said lever.

2. In a servo system, the combination of means responsive to a control fluid pressure, valve means for controlling said control fluid pressure, first and second levers mounted for rotation about an axis, means responsive to a variable input force operatively connected to said first and second levers for rotating said levers about said axis, said valve means being operatively connected to and actuated by said first lever, a third lever mounted for rotation about an axis, said first axis being disposed at a right angle to said second axis, resilient means operatively connected to said third lever for loading said lever with a predetermined constant reference force, roller means operatively connected to said second and third levers, said roller means being movable along said second lever to cause an increase or a decrease in the effective lever arm thereof and being movable along said third lever in a direction parallel to said second named axis, and follow-up means operatively connected to said first named means and said roller means whereby said effective lever arm is caused to vary as a function of the position of said first named means.

3. In a servo system, the combination of means responsive to a control fluid pressure, valve means for controlling said control fluid pressure, a plurality of levers fixed in position relative to one another and mounted for rotation about an axis, means responsive to an input signal operatively connected to said plurality of levers for loading said levers as a function of said input signal, said valve means being operatively connected to and actuated by one of the levers in said plurality of levers, a lever mounted for rotation about an axis, resilient means operatively connected to said lever for imposing a predetermined constant force thereon, roller means operatively connected to said lever and another lever in said plurality of levers through which said predetermined constant force is applied to said plurality of levers to balance the load applied thereto by said input signal responsive means, and means operatively connected to said first named means and said roller means for actuating said roller means in followup action to movement of said first named means, said roller means being displaced along said one of said plurality of levers such that the effective lever arm thereof is varied in proportion to variations in the input pressure signal.

4. In a servo system, the combination of means responsive to a control fluid pressure, means responsive to an input signal, means including first and second levers operatively connected to and actuated by said last named means as a function of said input signal, valve means operatively connected to and actuated by said first lever for controlling said control fluid pressure, resilient means operatively connected to said second lever for loading said second lever with a constant reference force in opposition to the input signal, and means including follow-up means operatively connected to said first named means and said second lever for varying the effective lever arm of said second lever through which said constant reference force acts in opposition to said input signal.

5. In a servo system as claimed in claim 4 wherein said resilient means includes a spring and temperature responsive means, said spring and temperature responsive means having similar temperature response characteristics, said spring and temperature responsive means being operatively connected such that changes in the output force of said spring caused by variations in ambient temperature are compensated for by said temperature responsive means whereupon the output force of said spring is maintained constant irrespective of the variations in ambient temperature.

6. In a servo system as claimed in claim 4 wherein said resilient means includes a compression spring and temperature responsive means, said compression spring and said temperature responsive means having similar response characteristics to variations in an ambient temperature and being arranged such that variations in the output force of said spring caused by variations in said ambient temperature are compensated for by said temperature responsive means which adjusts the length of said spring to maintain the output force of said spring at said predetermined constant value.

7. In a servo system, the combination of means responsive to a control fluid pressure, means responsive to a first input signal, means responsive to a second input signal, valve means for controlling said control fluid pressure, and means operatively connected to said valve means and said second and third means for controlling the operation of said valve means as a function of the ratio of said first and second input signals, said last named means including first lever means actuated by said second named means about an axis, second lever means actuated by said third named means about an axis perpendicular to said first named axis, and force transmitting means operatively connected to said first and second lever means and actuated by said first named means, said force transmitting means being movable in a direction parallel to said second named axis and perpendicular to said first named axis whereupon the effective lever arm of said first lever means is caused to increase or decrease in accordance with variations in said first input signal and said second signal.

8. In a servo system, the combination of means responsive to a variable input force, positionable means, means operatively connected to said first named means and said positionable means for controlling the position of said positionable means as a function of said input force including a first lever having a constant effective lever arm, a second lever having a variable effective lever arm fixedly secured to said first lever, said first lever being loaded by said input force and feedback means operatively connected to said positionable means and said second lever for canceling the effect of said input force on said positionable means, said feedback means including a third lever loaded with a constant reference force, means operatively connected to said positionable means, said third lever and said second lever for transmitting said constant reference force from said third lever to said second lever in opposition to said input force, said last named means being positioned along said second lever by said positionable means to cause an increase or a decrease in said variable effective lever arm in accordance with an increase or a decrease, respectively, in said input force.

9. In a servo system as claimed in claim 8 wherein said first and second levers are mounted for rotation about a common axis, and said third lever is mounted for rotation about an axis disposed at a right angle to said common axis.

10. In a servo system, the combination of means responsive to a control fluid pressure, valve means for controlling the control fluid pressure, means responsive to an input signal, linkage means including a lever operatively connected to said valve means and said last named means for controlling the position of said valve means as a function of said input signal and means operatively connected to said linkage means for canceling the effect of said input signal on said valve means, said last named means including resilient means providing a constant reference force, a roller operatively connected between said resilient means and said lever, and means connecting said roller with said first named means for moving said roller in follow-up action to said first named means.

11. In a control apparatus the combination of means responsive to a first input force, means responsive to a second input force, means responsive to an output force, and means for controlling said output force as a predetermined function of said first and second input forces including a lever operatively connected to and loaded by said first input force responsive means to provide a first input torque, said lever being rotated about an axis, force transmitting means operatively connected to said lever and said second input force responsive means, said second input force responsive means loading said lever to provide a second input torque which acts in opposition to said first input torque, and follow-up means actuated by said output force responsive means operatively connected to said force transmitting means for actuating the same, said force transmitting means being actuated by said follow-up means relative to said axis to cause a variation in the effective lever arm of said lever in accordance with variations in said first and second input forces whereupon said first input torque is balanced by said second input torque.

12. In a control apparatus, the combination of means responsive to an output signal, means responsive to a first input signal, means including first and second levers operatively connected to and actuated by said last named means as a function of said first input signal, means operatively connected to and actuated by said first lever for controlling said output signal, resilient means operatively connected to said second lever for loading said second lever with a constant reference force in opposition to said first input signal, means responsive to a second input signal operatively connected to said resilient means for modifying said constant reference force in accordance with variations in said second input signal, and means including followup means operatively connected to said output signal responsive means and said second lever for varying the effective lever arm of said second lever through which said constant reference force acts in opposition to said first input signal.

13. In a control apparatus as claimed in 11 wherein one of said input forces is derived from a resilient member for producing a force which acts in opposition to the other of said input forces and means responsive to a variable input signal operatively connected to said resilient member for varying the force thereof as a function of said variable input signal.

14. In a closed loop moment balance system, pressure responsive means adapted to be influenced by at least two distinct fluid pressures, a pivotally supported moment arm, means connected to said pressure responsive means for resiliently creating and sequentially applying an artificial reference force at various points along said moment arm, valve means secured to the free end of said moment arm for varying the magnitude of at least one of said distinct fluid pressures, and means for directing a force input to said moment arm for actuating said valve means.

15. In a closed loop moment balance system, pressure responsive means adapted to be influenced by at least two distinct fluid pressures, a pivotally supported moment arm, means connected to said pressure responsive means for resiliently creating and sequentially applying an artificial reference force of constant magnitude at various points along said moment arm, valve means secured to the free end of said moment arm for varying the magnitude of at least one of said distinct fluid pressures, and means for directing a force input to said moment arm for actuating said valve means.

16. In a closed loop moment balance system, pressure responsive means adapted to be influenced by at least two distinct fluid pressures, a pivotally supported moment arm, means connected to said pressure responsive means for resiliently creating and sequentially applying an artificial reference force at various points along said moment arm, thermostatic means cooperating with said resiliently created force and adapted to maintain a constant magnitude of said force regardless of variations in temperature, valve means secured to the free end of said moment arm for varying the magnitude of at least one of said distinct fluid pressures, and means for directing a force input to said moment arm for actuating said valve means.

17. In a closed-loop error-detecting force balance system, a pivotally mounted moment arm, force input means operatively engaging said moment arm at a fixed distance from said pivotal mounting and adapted to create an error signal tending to rotate said moment arm, pressure responsive means adapted to be influenced by at least two distinct fluid pressures and capable of two directional movement, a resiliently created resisting force operatively connected to said pressure responsive means and adapted to resist the tendency of said moment arm to rotate, valve means connected to said moment arm for varying the magnitude of at least one of said distinct fluid pressures, said pressure responsive means and said resiliently created force being so arranged with respect to each other so as to form a substantially constant resisting force to said moment arm at a variable effective lever arm, said effecting lever arm varying in length dependent on the magnitude of said error signal.

18. In a closed-loop error-detecting force balance system, a pivotally mounted moment arm, force input means operatively engaging said moment arm at a fixed distance from said pivotal mounting and adapted to create an error signal tending to rotate said moment arm, pressure responsive means adapted to be influenced by at least two distinct fluid pressures and capable of two directional movement, means connected to said pressure responsive means for resiliently creating a resisting force adapted to resist the tendency of said moment arm to rotate, valve means connected to said moment arm for varying the magnitude of at least one of said distinct fluid pressures, said pressure responsive means and said means resiliently creating a resisting force being so arranged with respect to each other so as to form a substantially constant resisting force to said moment arm at a variable effective lever arm.

19. A closed loop moment balance system, comprising pressure responsive means, conduit means for directing an actuating fluid to said pressure responsive means, a pivotally supported moment arm, means connected to said pressure responsive means for resiliently creating and sequentially applying an artificial reference force at various points along said moment arm, valve means operatively connected to said moment arm for varying the magnitude of the pressure of said actuating fluid, and means for directing a force input to said moment arm for actuating said valve means.

20. A closed loop moment balance system, comprising pressure responsive means, conduit means for directing an actuating fluid to said pressure responsive means, a pivotally supported moment arm, means connected to said pressure responsive means for resiliently creating and sequentially applying an artificial reference force at various points along said moment arm, thermostatic means cooperating with said means for creating said resilient force and adapted to maintain a constant magnitude of said force regardless of variations in temperature, valve means operatively connected to said moment arm for varying the magnitude of the pressure of said actuating fluid, and means for directing a force input to said moment arm for actuating said valve means.

21. In a closed loop moment balance system, two-diameter piston means adapted to be influenced by at least two distinct fluid pressures, a pivotally supported moment arm, spring means adapted to create a force and connected to said two-diameter piston means in a manner so as to be applied at various points along said moment arm, thermostatic means cooperating with said spring means and adapted to increase the deflection of said spring as temperature increases, valve means secured to the free end of said moment arm for varying the magnitude of at least one of said distinct fluid pressures, and means for directing a force input to said moment arm for actuating said valve means.

References Cited by the Examiner
UNITED STATES PATENTS

| | | | |
|---|---|---|---|
| 2,220,176 | 11/1940 | Rosenberger | 121—41 |
| 2,299,430 | 10/1942 | Sexton | 121—41 |
| 2,507,498 | 5/1950 | Brown | 121—41 |
| 2,622,393 | 12/1952 | Edwards et al. | 121—41 |
| 2,643,055 | 6/1955 | Sorteberg | 137—85 |
| 2,821,065 | 1/1958 | Starkey | 60—39.28 |

SAMUEL LEVINE, *Primary Examiner.*

KARL J. ALBRECHT, RALPH H. BRAUNER,
*Examiners.*